(12) United States Patent
Thompson et al.

(10) Patent No.: US 7,043,922 B2
(45) Date of Patent: May 16, 2006

(54) METHOD OF FORMING A FUEL FEED PASSAGE IN THE FEED ARM OF A FUEL INJECTOR

(75) Inventors: Kevin E. Thompson, West Des Moines, IA (US); Gregory L. Helton, Des Moines, IA (US)

(73) Assignee: Delavan Inc, West Des Moines, IA (US)

( * ) Notice: Subject to any disclaimer, the term of this patent is extended or adjusted under 35 U.S.C. 154(b) by 74 days.

(21) Appl. No.: 10/760,859

(22) Filed: Jan. 20, 2004

(65) Prior Publication Data

US 2005/0155224 A1    Jul. 21, 2005

(51) Int. Cl.
  F02C 3/00      (2006.01)
  F02C 7/22      (2006.01)
(52) U.S. Cl. .......................... 60/772; 239/404
(58) Field of Classification Search .............. 60/737, 60/740, 742, 748, 772; 239/404, 405, 406
See application file for complete search history.

(56) References Cited

U.S. PATENT DOCUMENTS

| 1,713,357 A |   | 5/1929 | St. Clair |
| 3,172,735 A | * | 3/1965 | Barclay et al. ............. 239/404 |
| 3,337,135 A | * | 8/1967 | Blakely et al. ............. 239/405 |
| 4,491,272 A | * | 1/1985 | Bradley et al. ............. 607/748 |
| 4,797,089 A |   | 1/1989 | Schubach et al. |
| 5,882,514 A | * | 3/1999 | Fletcher ...................... 210/223 |
| 6,082,113 A |   | 7/2000 | Prociw et al. |
| 6,276,141 B1 |  | 8/2001 | Pelletier |
| 6,457,316 B1 | | 10/2002 | Czachor et al. |
| 6,539,724 B1 | | 4/2003 | Cornwell et al. |
| 6,547,163 B1 | | 4/2003 | Mansour et al. |

FOREIGN PATENT DOCUMENTS

EP        1 245 900 A2    10/2002
WO    WO 2005/061964 A1    7/2005

OTHER PUBLICATIONS

International Search Report on behalf of the French Intellectual Property Institute (INPI) issued Dec. 19, 2005.

* cited by examiner

Primary Examiner—Ted Kim
(74) Attorney, Agent, or Firm—Scott D. Wofsy; Edwards Angell Palmer & Dodge LLP

(57) ABSTRACT

A method is disclosed for forming a fuel feed passage in the feed arm of a fuel injector. The method includes the steps of providing a fuel feed passage in the feed arm of a fuel injector, whereby the fuel feed passage has an initial cross-sectional flow area that corresponds with an initial fuel flow velocity, an initial convection heat transfer coefficient and initial localized wetted wall temperatures for the fuel feed passage, for a given fuel flow rate and fuel temperature. The method further includes decreasing the initial cross-sectional flow area of the fuel feed passage so as to increase the fuel flow velocity and the convection heat transfer coefficient for the fuel feed passage, while lowering the localized wetted wall temperatures for the fuel feed passage, without varying the given fuel flow rate and fuel temperature.

24 Claims, 3 Drawing Sheets

METHOD OF FORMING A FUEL FEED PASSAGE IN THE FEED ARM OF A FUEL INJECTOR

BACKGROUND OF THE INVENTION

1. Field of the Invention

The subject invention is directed to fuel injectors, and more particularly, to a cost-effective method of forming a large diameter fuel feed passage in the feed arm of a fuel injector employed in a gas turbine engine.

2. Background of the Related Art

In designing fuel nozzles for gas turbine engines, it is desirable to increase fuel passage convection or heat transfer coefficients so as to reduce the wetted wall temperatures within the fuel feed passage. This serves to lower the operating temperatures of the fuel nozzle, which in turn, reduces the potential for fuel coking and carbon formation within the fuel feed passage. Fuel coking within the nozzle can cause reductions in fuel flow. This can lead to undesirable thermal gradients within the combustion system causing hardware distress and ultimately failure.

Typically, to control the wetted wall temperature in the fuel passage of a fuel injector, the diameter of a fuel passage is minimized. This causes higher fuel flow velocities and heat transfer coefficients for a given fuel flow rate and fuel temperature. However, as the diameter of the fuel passage decreases to reduce wetted wall temperatures, the pressure drop through the fuel passage increases undesirably. When combined with the manufacturing challenges and inefficiencies associated with machining small diameter passageways, it is clear that there are significant disadvantages in such a design.

Another method of reducing wetted wall temperatures in a fuel nozzle is disclosed in U.S. Pat. No. 6,457,316. Here, contoured swirl vanes extend from or are otherwise integrally formed with the surfaces of the fuel supply tubes of the nozzle. The contoured swirl vanes accelerate the fuel flowing through the tubes. The swirl velocity induced by the vanes increases the convection coefficient, which in turn, facilitates a reduction in wetted wall temperatures downstream from the swirl vanes. The contoured swirl vanes, like the small diameter passages described above, present manufacturing challenges.

It would be beneficial therefore, to provide a method of forming a fuel feed passage in a fuel injector that overcomes the manufacturing challenges and inefficiencies associated with the prior art, while effectively reducing the wetted wall temperatures within the fuel feed passage of the injector so as to improve turbine efficiency.

SUMMARY OF THE INVENTION

The subject invention is directed to a new, useful and cost-effective method of forming a fuel feed passage in the feed arm of a fuel injector having a relatively large diameter as compared to traditional fuel feed passages. The method includes the steps of machining, boring, drilling or otherwise providing a fuel feed passage in the feed arm of a fuel injector, whereby the fuel feed passage has an initial cross-sectional flow area that corresponds with an initial fuel flow velocity, an initial convection heat transfer coefficient and initial localized wetted wall temperatures for the fuel feed passage, and for a given fuel flow rate and fuel temperature. The method further includes decreasing the initial cross-sectional flow area of the fuel feed passage so as to increase the fuel flow velocity and the convection heat transfer coefficient for the fuel feed passage, while lowering the localized wetted wall temperatures for the fuel feed passage, without varying the given fuel flow rate and fuel temperature.

Preferably, the step of decreasing the cross-sectional flow area of the fuel feed passage includes positioning or otherwise securing a shaped structure within the fuel feed passage. The shaped structure is preferably a solid cylindrical rod, which is centrally located within the fuel feed passage. However, it is envisioned and well within the scope of the subject disclosure that the shaped structure may be polygonal or elliptical in cross-sectional configuration. It is also envisioned and well within the scope of the subject disclosure that the shaped structure may be formed by a plurality of shaped structures of similar or different cross-sectional configuration, and that these plural shaped structures may be bundled together or otherwise disposed relative to one another within the fuel feed passage to form a composite structure that decreases the initial cross-sectional flow area of the fuel feed passage. For example, the shaped structure may comprise a plurality of cylindrical rods of relatively small diameter that are bundled together to form a shaped structure of greater composite diameter which is subsequently positioned within the fuel feed bore.

In accordance with a preferred embodiment of the subject invention, the method of forming a fuel feed passage further includes the step of imparting a tangential velocity component to fuel flowing through the fuel feed passage at the given flow rate. Preferably, this is accomplished by providing a helical formation around the shaped structure. In one embodiment of the subject invention, this is accomplished by affixing a wire in a helical pattern about the outer periphery of a cylindrical rod. In another embodiment of the subject invention, this is accomplished by integrally forming a helix about the outer periphery of a cylindrical rod. The method further includes the step of selecting the pitch of the helical formation to produce a desired fuel flow velocity at the given fuel flow rate.

In the example presented above, wherein the shaped structure comprises a bundle of cylindrical rods of relatively small diameter, it is envisioned that the bundle of rods could be twisted about its central axis to produce a helical formation of desired pitch that imparts a tangential velocity component to fuel flowing through the fuel feed passage to obtain a desired flow velocity.

The subject invention is also directed to a method of forming a fuel feed passage in the feed arm of a fuel injector that includes the steps of providing a cylindrical fuel feed passage in the feed arm of a fuel injector, whereby the fuel feed passage has an initial cross-sectional flow area that corresponds with an initial fuel flow velocity for a given fuel flow rate, positioning a cylindrical rod within the cylindrical fuel feed passage, and forming a helix about the outer periphery of the cylindrical rod. The method further includes the step of selecting the outer diameter of the cylindrical rod or the pitch of the helix to obtain a desired fuel flow velocity for the fuel feed passage at the given fuel flow rate.

These and other aspects of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to employ method of the present invention, embodiments thereof will be described in detail hereinbelow with reference to the drawings, wherein.

DETAILED DESCRIPTION OF THE PREFERRED EMBODIMENTS

The subject invention is directed to a new, useful and cost-effective method of forming a fuel feed passage in the feed arm of a fuel injector, primarily used in a gas turbine engine. As described in detail below, the fuel feed passage formed by the method of the subject invention has a relatively large diameter, as compared to a traditional fuel feed passage which has a relatively small diameter designed to produce higher fuel flow velocities and heat transfer coefficients for a given fuel flow rate and fuel temperature. This reduces the wetted wall temperatures within the fuel feed passage. Typically, a larger diameter fuel feed passage, such as that which is initially formed in the injector of the subject invention, will lead to lower fuel flow velocities and lower heat transfer coefficients, resulting in higher wetted wall temperatures. However, this is alleviated in a fuel flow passage formed in accordance with the methodology of the subject invention, by positioning a shaped structure within the relatively large diameter fuel feed passage.

Figure 1:
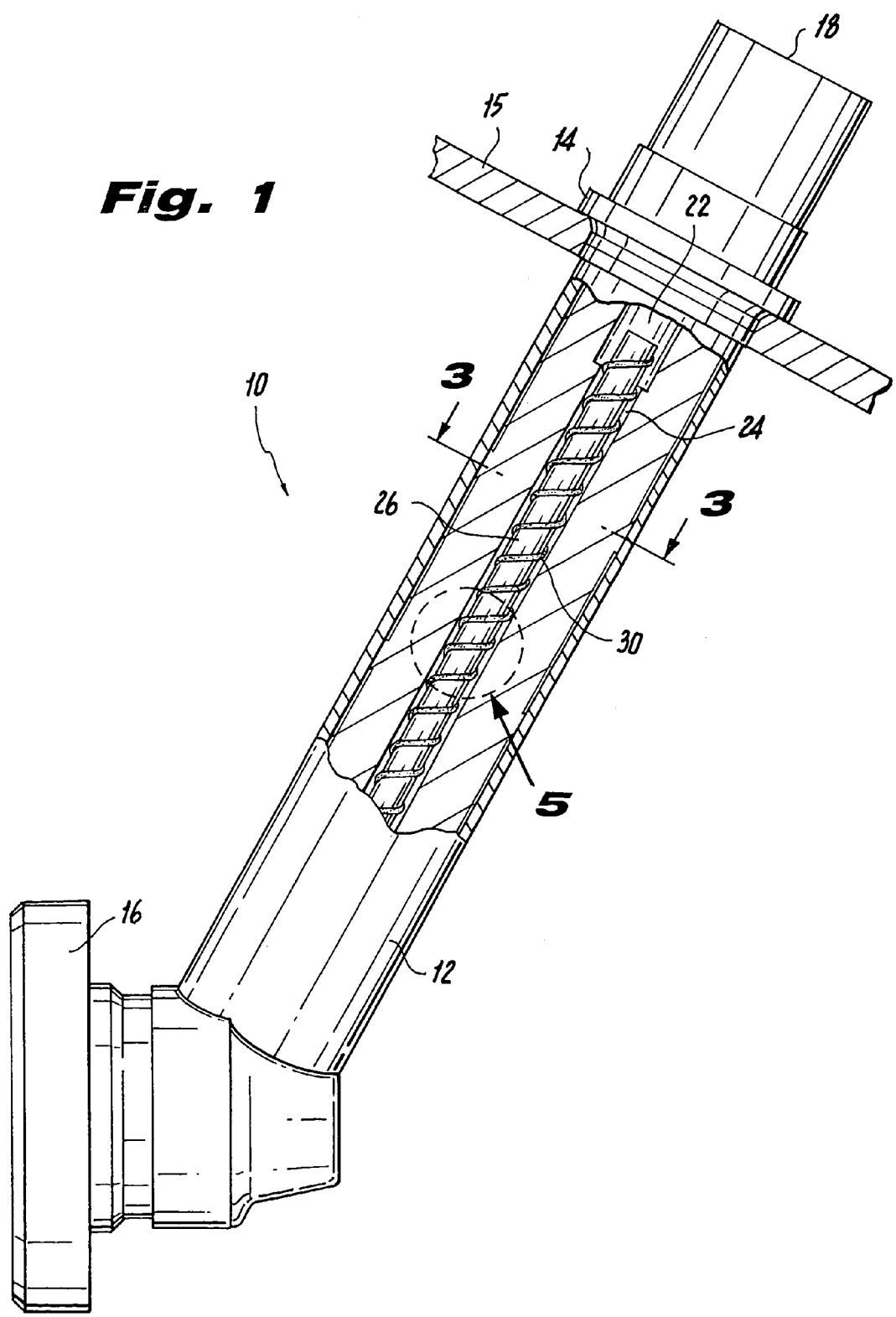
FIG. 1 is a side elevational view in partial cross section of a fuel injector constructed in accordance with a preferred embodiment of the subject invention, which has a helical fuel feed passage defined at least in part by a cylindrical rod and a wire wrapped about the outer periphery of the rod in a helical pattern.

Referring now to the drawings wherein like reference numerals identify similar structural elements or features of the subject invention, there is illustrated in FIG. 1 a fuel injector constructed in accordance with a preferred embodiment of the subject invention and designated generally by reference numeral 10. Fuel injector 10 includes an elongated stem or feed arm 12. A mounting flange 14 is provided at the upstream end portion of feed arm 12 and a nozzle assembly 16 is provided at the downstream end portion of feed arm 12. The mounting flange 14 enables the fuel injector 10 to be fastened to the wall 15 of the combustion chamber of a gas turbine in a conventional manner. The nozzle assembly 16 delivers atomized fuel into the combustion chamber.

A fuel inlet 18 is formed adjacent the mounting flange 14 of the fuel injector 10. The fuel inlet 18 receives fuel from a fuel pump (not shown) associated with the engine at a given flow rate and temperature. The fuel inlet 18 communicates with an inlet bore 22, which in turn, communicates with a fuel feed bore 24 that extends through the feed arm 12 from the fuel inlet 18 to the nozzle assembly 16. The fuel feed bore 24 is machined, bored, drilled or otherwise formed to have a relatively large diameter as compared to traditional fuel feed passages of lesser diameter, that are typically formed in fuel injectors found in the prior art. The large diameter fuel feed bore 24 has an initial cross-sectional flow area associated therewith that corresponds to an initial fuel flow velocity, an initial convection heat transfer coefficient and initial localized wetted wall temperatures, for a given fuel flow rate and fuel temperature.

In accordance with the methodology of the subject invention, a shaped structure, preferably in the form of a solid cylindrical rod 26 is positioned or otherwise secured by conventional means within the fuel feed bore 24, preferably in axial alignment with the center of the bore, so as to define an annular gap 28 (see FIG. 3) between the interior wall of the bore 20 and the outer peripheral wall of the rod 26. The formation of the annular gap 28 within the fuel feed bore 24 has the advantageous effect of decreasing or otherwise reducing the initial cross-sectional flow area of the fuel feed bore 24. This increases the fuel flow velocity and the convection heat transfer coefficient, and advantageously lowers the localized wetted wall temperatures within the relatively large diameter fuel feed bore 24, without having to vary the given fuel flow rate and fuel temperature. The increased wetted surface area provided by the relatively large diameter fuel feed bore of the subject invention, provides increased heat flux out of the fuel nozzle, as compared to typical small diameter fuel feed passages. This provides better localized cooling and lower local wetted wall temperatures within the fuel feed bore.

As previously noted, it is envisioned and well within the scope of the subject disclosure that shaped structures other than the cylindrical rod 26 described and illustrated herein may be employed in the fuel feed passage of the subject invention, such as, for example, polygonal or elliptical shaped structures. It is also envisioned and well within the scope of the subject disclosure that plural shaped structures of similar or different cross-sectional configuration may be employed in the fuel feed passage of the subject invention.

Figure 3:
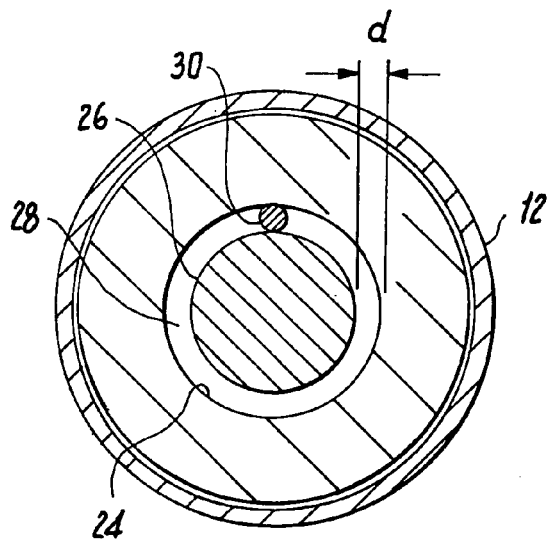
FIG. 3 is a cross-sectional view taken along line 3—3 of FIG. 1 illustrating the geometric relationship between the structures defining the helical fuel feed passage formed in the fuel nozzle of the subject invention.

Referring to FIG. 3, the size of the annular gap 28 or the gap distance "d" within fuel feed bore 24 can be selected, controlled or otherwise designed to obtain a desired fuel flow velocity for a given fuel flow rate. Moreover, the size of the annular gap can be designed to provide an effective flow area that is consistent with a typical small diameter fuel feed bore, providing equivalent flow velocities and heat transfer coefficients. This can be accomplished by selecting the outer diameter of the cylindrical rod 26 so as to correspond to a desired fuel flow velocity.

Figure 2:
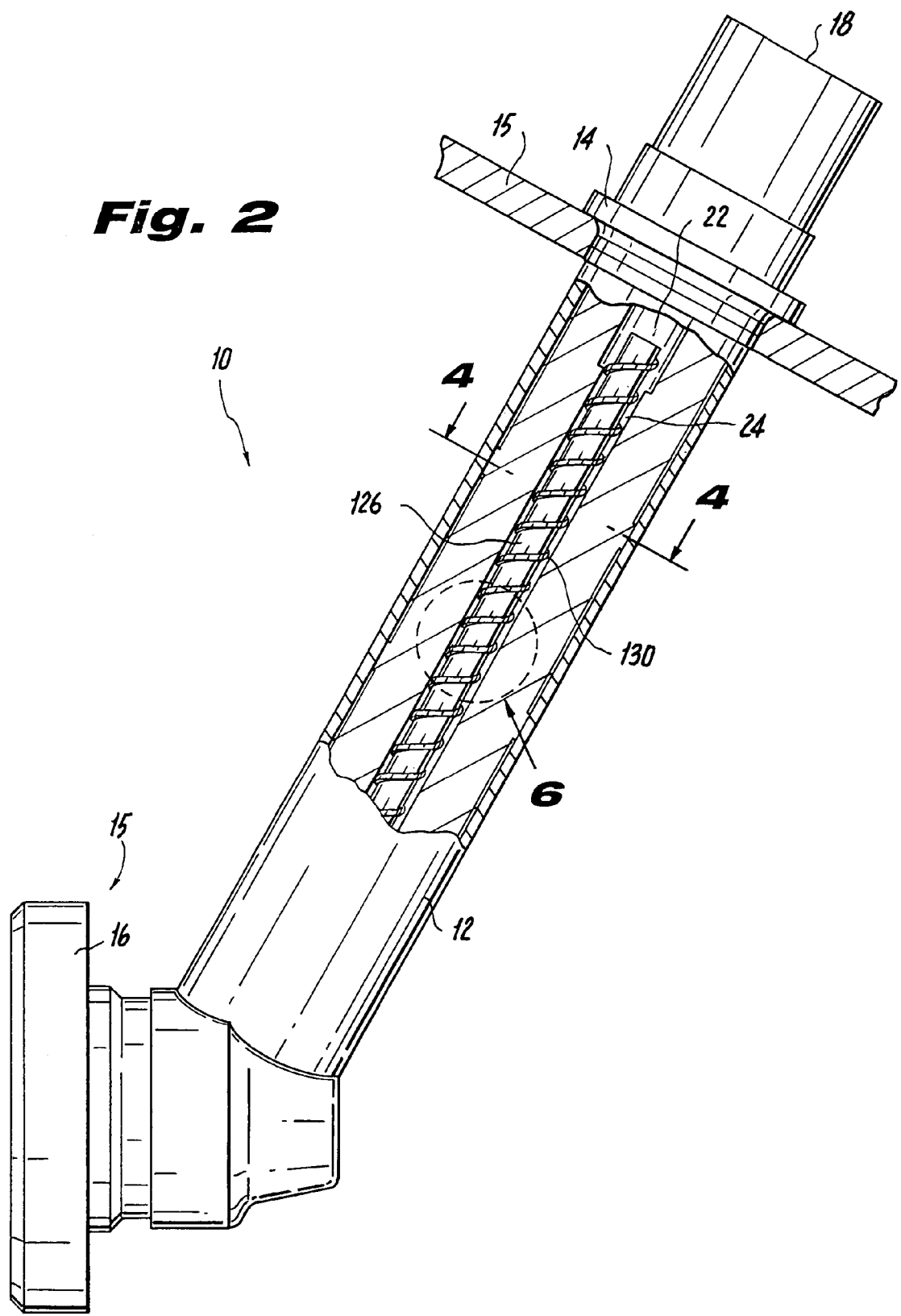
FIG. 2 is a side elevational view in partial cross section of a fuel injector constructed in accordance with a preferred embodiment of the subject invention, which has a helical fuel feed passage defined at least in part by a cylindrical rod having an integral helix formed about the outer periphery thereof.
Figure 4:
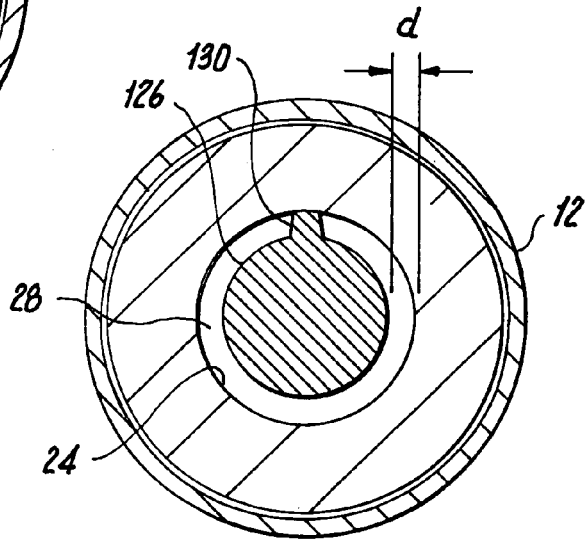
FIG. 4 is a cross-sectional view taken along line 4—4 of FIG. 2 illustrating the geometric relationship between the structures defining the helical fuel feed passage formed in the fuel nozzle of the subject invention.
Figure 5:
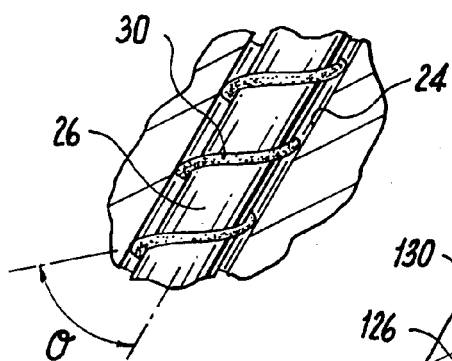
FIG. 5 is a localized view of the fuel feed passage of the nozzle shown in FIG. 1 illustrating the pitch of the helically wrapped wire relative to the longitudinal axis of the cylindrical rod.
Figure 6:
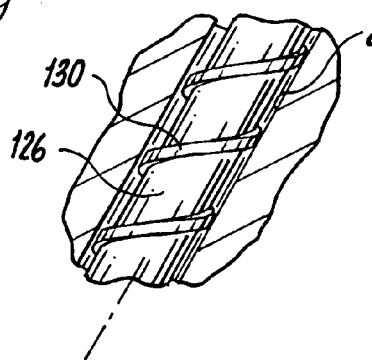
FIG. 6 is a localized view of the fuel feed passage of the nozzle shown in FIG. 2 illustrating the pitch of the integral helix relative to the longitudinal axis of the cylindrical rod.

In accordance with a preferred embodiment of the subject invention, the absolute flow velocity for fuel at a given fuel flow rate passing through fuel feed bore 24 is increased by imparting or otherwise introducing a tangential velocity component to the fuel flowing through the annular gap 28. This is preferably accomplished by providing a helical formation about the outer periphery of the cylindrical rod 26. In one embodiment of the subject invention, this is accomplished by brazing or otherwise affixing a wire 30 to the outer periphery of cylindrical rod 26 in a helical pattern, as illustrated for example, in FIG. 5. In another embodiment of the subject invention illustrated in FIGS. 2, 4 and 6, this is accomplished by integrally forming a helix 130 about the outer periphery of cylindrical rod 126, as shown for example, in FIG. 6.

Figure 7:
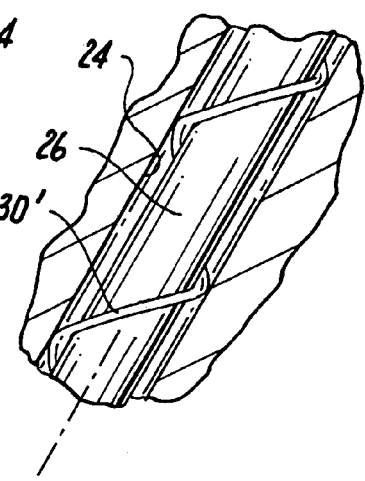
FIG. 7 is a localized view of the fuel feed passage of the nozzle, similar to that shown in FIG. 1, wherein the pitch of the helically wrapped wire is increased relative to the pitch of the helically wrapped wire shown in FIG. 5.

In accordance with a preferred embodiment of the subject invention, the pitch of the helical formation (30, 130) can be selected to control the desired flow velocities through the fuel injector. See for example, the differences in the pitch of the wire wrapped helix (30, 30') shown in FIGS. 5 and 7. The pitch of the helical formation (30, 130) is the distance along the longitudinal axis of the rod for one complete revolution of the helix. Thus, the pitch of the wire helix 30' shown in FIG. 7 is greater than the pitch of the wire helix 30 shown in FIG. 5. Those skilled in the art will readily appreciate that increasing the pitch of the helical formation around the rod will produce lower fuel flow velocities in the fuel feed passage. It should also be noted that the pitch of the helix and the helix angle θ are inversely proportional. Thus, a decrease in the helix angle will result in lower fuel flow velocities.

Tables 1.0 through 3.0 illustrate how the helix angle of the helically wrapped wire and the size of the annular gap as defined by the outer diameter of the cylindrical rod can be selected or otherwise designed to obtain a desired fuel flow velocity for the fuel injector of the subject invention. This flexibility gives the nozzle designer more control over the pressure drop through the injector without having to sacrifice the gains in flow velocities and heat transfer coefficients achieved by increasing the diameter of the fuel passage in accordance with the methodology of the subject invention.

The data set forth below illustrates the fuel flow velocities obtained with two different helical fuel passage configurations in a fuel injector of an aircraft engine operating in three different flight conditions. In each instance, the fuel delivered to the injector is Jet A (JP-8), the fuel temperature is 250° F., the fuel density is 0.02710 lbm/in$^3$ and the discharge coefficient Cd is 0.6.

TABLE 1.0

| | | | Conditions: Maximum Climb | | | |
|---|---|---|---|---|---|---|
| Flow Rate (lbm/hr) | Bore Diameter (in.) | Rod Diameter (in.) | Gap Distance (in.) | Swirling Flow Area (.in$^2$) | Helix Angle (deg.) | Fuel Velocity (ft/sec) |
| 148.3 | 0.2031 | 0.1801 | 0.0115 | 0.00484 | 45° | 26.17 |
| 148.3 | 0.2031 | 0.1661 | 0.0185 | 0.00444 | 65° | 28.54 |

TABLE 2.0

| | | | Conditions: Cruise | | | |
|---|---|---|---|---|---|---|
| Flow Rate (lbm/hr) | Bore Diameter (in.) | Rod Diameter (in.) | Gap Distance (in.) | Swirling Flow Area (.in$^2$) | Helix Angle (deg.) | Fuel Velocity (ft/sec) |
| 32.7 | 0.2031 | 0.1801 | 0.0115 | 0.00484 | 45° | 5.77 |
| 32.7 | 0.2031 | 0.1661 | 0.0185 | 0.00444 | 65° | 6.29 |

TABLE 3.0

| | | | Conditions: Flight Idle | | | |
|---|---|---|---|---|---|---|
| Flow Rate (lbm/hr) | Bore Diameter (in.) | Rod Diameter (in.) | Gap Distance (in.) | Swirling Flow Area (.in$^2$) | Helix Angle (deg.) | Fuel Velocity (ft/sec) |
| 16.4 | 0.2031 | 0.1801 | 0.0115 | 0.00484 | 45° | 2.89 |
| 16.4 | 0.2031 | 0.1661 | 0.0185 | 0.00444 | 65° | 3.16 |

As illustrated by the data set forth in Tables 1.0 through 3.0, under all three flight conditions, a decrease in the helix angle (i.e., an increase in helical pitch) combined with an increase in the annular gap size (i.e., a decrease in rod diameter) produces lower fuel flow velocities. Lower fuel flow velocities, a larger annular gap and increased helix pitch advantageously lead to a lower pressure drop through the fuel passage. Therefore, each of these parameters can be controlled to optimize the nozzle/injector design. It should be noted that when both parameters are increased (i.e., gap size and helix pitch) the change in the pitch of the helix is the dominant factor with respect to changes in the fuel flow velocity.

In accordance with the subject invention, an increase in the surface area for convection of the fuel feed passages results in a decrease in the wetted wall temperatures within the fuel feed passage, for a given fuel feed rate, convection heat transfer coefficient and fuel temperature. Indeed, it can be shown that the change in the wetted wall temperatures within the fuel feed passage is inversely proportional to the change in the surface area for convection of the fuel feed passage, as exemplified by the following mathematical derivation.

The heat flow into the fuel injector may be expressed in the following manner:

$$q = h^* A^* \Delta T$$

Where:

h=convection heat transfer coefficient

A=surface area for convection $$\Delta T = T_{ww} - T_f$$

$T_{ww}$=wetted wall temperature $T_f$=fuel temperature

It can be assumed that the heat flow into the fuel injector is equivalent for a typical baseline fuel feed passage and for an annular fuel feed passage formed in accordance with the methodology of the subject invention. This equivalence can be expressed by the following equation:

$$q_{baseline\ feed} = q_{annular\ feed}$$

Therefore, it follows that:

$$(h^* A^* \Delta T)_{baseline\ feed} = (h^* A^* \Delta T)_{annular\ feed}$$

In accordance with the subject invention, a helical formation may be provided about the rod forming the annular fuel feed passage and the helix angle/pitch can be adjusted such that the heat transfer coefficient for the baseline feed passage and the heat transfer coefficient for the annular feed passage are substantially equal. This can be expressed as follows:

$$(A^* \Delta T)_{baseline\ feed} \approx (A^* \Delta T)_{annular\ feed}$$

Therefore, it can be appreciated by those skilled in the art, that temperature difference is inversely proportional to a change in convection surface area, as expressed in the following equation:

$$\Delta T_{baseline}/\Delta T_{annular\ feed} \approx A_{annular\ feed}/A_{baseline}$$

Accordingly, for a given fuel temperature $T_f$, the wetted wall temperature $T_{ww}$ can be advantageously reduced by employing an annular fuel feed annulus formed in accordance with the subject invention, as shown by the following expression:

$$T_{ww} = \Delta T_{annular\ feed} + T_f$$

Thus, by way of example, if the surface area of an annular fuel feed passage is twice the surface area of a baseline fuel feed bore, the temperature difference ($\Delta T_{annular\ feed}$) for the annular feed bore will be half that of the baseline fuel feed bore, significantly reducing the wetted wall temperature, for a given fuel temperature and fuel flow.

Although the method of the subject invention has been described with respect to preferred embodiments, those skilled in the art will readily appreciate that changes and modifications may be made thereto without departing from the spirit and scope of the subject invention as defined by the appended claims.

What is claimed is:

1. A method of forming a fuel feed passage in the feed arm of a fuel injector comprising the steps of:
   a) providing a fuel feed passage in the feed arm of a fuel injector, the fuel feed passage having an initial cross-sectional flow area that corresponds with an initial fuel flow velocity, an initial convection heat transfer coefficient and initial localized wetted wall temperatures for the fuel feed passage, for a given fuel flow rate and fuel temperature;
   b) decreasing the initial cross-sectional flow area of the fuel feed passage by positioning a shaped structure within the fuel feed passage, so as to increase the fuel flow velocity and the convection heat transfer coefficient for the fuel feed passage, while lowering the localized wetted wall temperatures for the fuel feed passage, without varying the given fuel flow rate and fuel; and
   c) selecting the configuration of the shaped structure to produce a desired fuel flow velocity for the fuel feed passage at the given fuel flow rate.

2. A method according to claim 1, wherein the step of positioning a shaped structure within the fuel feed passage includes positioning a rod within the fuel feed passage.

3. A method according to claim 1, wherein the step of positioning a shaped structure within the fuel feed passage includes positioning a solid rod within the fuel feed passage.

4. A method according to claim 1, wherein the step of positioning a shaped structure within the fuel feed passage includes positioning a solid cylindrical rod centrally within the fuel feed passage to form an annular gap therein.

5. A method according to claim 4, further comprising the step of selecting the outer diameter of the cylindrical rod to produce a desired fuel flow velocity at the given fuel flow rate.

6. A method according to claim 4, further comprising the step of imparting a tangential velocity component to fuel flowing through the annular gap at the given flow rate by affixing a wire in a helical pattern about the outer periphery of the cylindrical rod.

7. A method according to claim 4, further comprising the step of imparting a tangential velocity component to fuel flowing through the annular gap at the given flow rate by integrally forming a helix about the outer periphery of the cylindrical rod.

8. A method according to claim 1, further comprising the step of imparting a tangential velocity component to fuel flowing through the fuel feed passage at the given flow rate.

9. A method according to claim 8, wherein the step of imparting a tangential velocity component to fuel flowing through the fuel feed passage at the given fuel flow rate includes providing a helical formation around the shaped structure.

10. A method according to claim 9, further comprising the step of selecting the pitch of the helical formation to produce a desired fuel flow velocity at the given fuel flow rate.

11. A method of forming a fuel feed passage in the feed arm of a fuel injector comprising the steps of:
    a) machining a fuel feed passage in the feed arm of a fuel injector, the fuel feed passage having an initial cross-sectional flow area that corresponds with an initial fuel flow velocity, an initial convection heat transfer coefficient and initial localized wetted wall temperatures for the fuel feed passage, for a given fuel flow rate and fuel temperature;
    b) positioning a shaped structure within the fuel feed passage so as to decrease the initial cross-sectional flow area of the fuel feed passage and thereby increase the fuel flow velocity and the convection heat transfer coefficient for the fuel feed passage, while lowering the localized wetted wall temperatures for the fuel feed passage, without varying the given fuel flow rate and fuel temperature;
    c) selecting the outer diameter of the shaped structure to produce a desired fuel flow velocity for the fuel feed passage at the given fuel flow rate; and
    d) providing a helical formation about the shaped structure to impart a tangential velocity component to fuel flowing through the fuel feed passage, and thereby produce a higher absolute fuel flow velocity for the fuel feed passage at the given fuel flow rate.

12. A method according to claim 11, wherein the step of positioning a shaped structure within the fuel feed passage includes positioning a rod within the fuel feed passage.

13. A method according to claim 11, wherein the step of positioning a shaped structure within the fuel feed passage includes positioning a solid rod within the fuel feed passage.

14. A method according to claim 11, wherein the step of positioning a shaped structure within the fuel feed passage includes positioning a solid cylindrical rod centrally within the fuel feed passage to form an annular gap therein.

15. A method according to claim 11, wherein the step of providing a helical formation on the shaped structure includes affixing a wire in a helical pattern about the outer periphery of the shaped structure.

16. A method according to claim 11, wherein the step of providing a helical formation on the shaped structure includes integrally forming a helix about the outer periphery of the shaped structure.

17. A method according to claim 11, further comprising the step of selecting the pitch of the helical formation to produce a desired absolute fuel flow velocity at the given fuel flow rate.

18. A method of forming a fuel feed passage in the feed arm of a fuel injector comprising the steps of:
    a) machining a cylindrical fuel feed passage in the feed arm of a fuel injector, the fuel feed passage having an initial cross-sectional flow area that corresponds with an initial fuel flow velocity, an initial convection heat transfer coefficient and initial localized wetted wall temperatures for the fuel feed passage, for a given fuel flow rate and fuel temperature;

b) positioning a solid cylindrical rod centrally within the fuel feed passage so as to decrease the initial cross-sectional flow area of the fuel feed passage by forming an annular gap therein and thereby increasing the fuel flow velocity and the convection heat transfer coefficient for the fuel feed passage, while lowering the localized wetted wall temperatures within the fuel feed passage, without varying the given fuel flow rate and fuel temperature;

c) selecting the outer diameter of the solid cylindrical rod to produce a desired fuel flow velocity for the fuel feed passage at the given fuel flow rate; and d) forming a helix about the outer periphery of the solid cylindrical rod to center the rod within the fuel feed passage and impart a tangential velocity component to fuel flowing through the fuel feed passage, thereby producing a higher absolute fuel flow velocity for the fuel feed passage at the given fuel flow rate.

19. A method according to claim 18, wherein the step of forming a helix about the solid cylindrical rod includes brazing a wire to the outer periphery of the solid cylindrical rod in a helical pattern.

20. A method according to claim 18, wherein the step of forming a helix about the solid cylindrical rod includes machining an integral helix about the outer periphery of the cylindrical rod.

21. A method according to claim 18, further comprising the step of selecting the pitch of the helix to produce a desired absolute fuel flow velocity at the given fuel flow rate.

22. A method of forming a fuel feed passage in the feed arm of a fuel injector comprising the steps of:

a) providing a cylindrical fuel feed passage in the feed arm of a fuel injector, whereby the fuel feed passage has an initial cross-sectional flow area that corresponds with an initial fuel flow velocity for a given fuel flow rate;

b) positioning a cylindrical rod within the fuel feed passage;

c) forming a helix about the outer periphery of the cylindrical rod; and d) selecting the outer diameter of the cylindrical rod and the pitch of the helix to obtain a desired fuel flow velocity for the fuel feed passage at the given fuel flow rate.

23. A method according to claim 22, wherein the step of forming a helix about the outer periphery of the cylindrical rod includes brazing a wire to the outer periphery of the cylindrical rod in a helical pattern.

24. A method according to claim 22, wherein the step of forming a helix about the outer periphery of the cylindrical rod includes machining an integral helix about the outer periphery of the cylindrical rod.

* * * * *